United States Patent
Blanchenay et al.

(10) Patent No.: US 11,068,763 B2
(45) Date of Patent: Jul. 20, 2021

(54) POWER SUPPLY WITH WIRELESSLY SUPPORTED PHASE OFFSET CONTROL FOR ACOUSTO-MAGNETIC SYSTEMS

(71) Applicant: Sensormatic Electronics, LLC, Boca Raton, FL (US)

(72) Inventors: Marc H. Blanchenay, Lighthouse Point, FL (US); John A. Allen, Pompano Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/512,801

(22) Filed: Jul. 16, 2019

(65) Prior Publication Data

US 2020/0026972 A1 Jan. 23, 2020

Related U.S. Application Data

(60) Provisional application No. 62/699,508, filed on Jul. 17, 2018.

(51) Int. Cl.
*G06K 19/06* (2006.01)
*G06K 19/07* (2006.01)

(52) U.S. Cl.
CPC .............. *G06K 19/0701* (2013.01)

(58) Field of Classification Search
CPC ... G08B 1/00; G08B 13/2411; G08B 13/2422
USPC .............. 235/492, 462.46, 472.02
See application file for complete search history.

(56) References Cited

U.S. PATENT DOCUMENTS

| | | | |
|---|---|---|---|
| 5,995,002 A | 11/1999 | Fallin et al. | |
| 6,020,856 A * | 2/2000 | Alicot | G08B 13/2471 340/572.7 |
| 6,111,507 A * | 8/2000 | Alicot | G08B 13/2402 340/551 |
| 6,201,469 B1 * | 3/2001 | Balch | G08B 13/2488 340/10.1 |
| 2019/0236323 A1 * | 8/2019 | Trivelpiece | G08B 13/2417 |

FOREIGN PATENT DOCUMENTS

WO 2001078028 A2 10/2001
WO 2002063771 A2 8/2002

* cited by examiner

*Primary Examiner* — Daniel St Cyr
(74) *Attorney, Agent, or Firm* — Arent Fox, LLP

(57) ABSTRACT

Systems and methods for synchronizing operations of incompatible systems. The methods comprise: programming receiver operations of a Power Supply ("PS") so that PS is interoperable with a first system of the incompatible systems; receiving by PS a wireless universal synchronization signal from a beacon of the first system; determining, by PS, a value for a phase offset setting of an internal signal conditioner circuit based on information contained in the wireless universal synchronization signal; generating a phase shifted Alternating Current ("AC") signal by applying a phase offset to an input AC power signal in accordance with the determined value for the phase offset setting; buffering the phase shifted AC signal to generate an output AC power signal; and using a zero crossing of the output AC power signal to synchronize transmit and receive operations of a second system of the incompatible systems with the first system's transmit and receive operations.

12 Claims, 7 Drawing Sheets

POWER SUPPLY WITH WIRELESSLY SUPPORTED PHASE OFFSET CONTROL FOR ACOUSTO-MAGNETIC SYSTEMS

CROSS REFERENCE TO RELATED APPLICATIONS

This application claims priority to U.S. Provisional Patent Application Ser. No. 62/699,508 entitled "POWER SUPPLY WITH WIRELESSLY SUPPORTED PHASE OFFSET CONTROL FOR ACOUSTO-MAGNETIC SYSTEMS" and filed on Jul. 17, 2018 the contents of which is incorporated herewith in its entirety.

BACKGROUND

Statement of the Technical Field

The present disclosure relates generally to acousto-magnetic systems. More particularly, the present disclosure relates to a power supply with wirelessly supported phase offset control for acousto-magnetic systems.

Description of the Related Art

Electronic Article Surveillance ("EAS") systems are often used by retail stores in order to minimize loss due to theft. One common way to minimize retail theft is to attach a security tag to an article such that an unauthorized removal of the article can be detected. In some scenarios, a visual or audible alarm is generated based on such detection. For example, a security tag with an EAS element (e.g., an Acousto-Magnetic ("AM") element) can be attached to an article offered for sale by a retail store. An EAS interrogation signal is transmitted at the entrance and/or exit of the retail store. The EAS interrogation signal causes the EAS element of the security tag to produce a detectable response if an attempt is made to remove the article without first detaching the security tag therefrom. The security tag must be detached from the article upon purchase thereof in order to prevent the visual or audible alarm from being generated.

Some AM based EAS systems use an AC power line for a synchronization reference. These EAS systems require that all surrounding systems (A) operate from the same synchronization reference or (B) have appropriate offsets to align transmit and receive functions. Without synchronization, poor performance and/or unwanted alarms affect the same systems which results in considerable frustration to customers, poor Return On Investment ("ROI"), and high service costs due to repeated technician visits.

To resolve these situations, close coordination and significant efforts are required between competing manufacturers of EAS equipment and service providers to synchronize their systems. These environments often require repeated interventions due to changes in the device landscape.

SUMMARY

The present disclosure concerns systems and methods for synchronizing operations of incompatible systems. The methods comprise: programming receiver operations of a power supply so that the power supply is interoperable with a first system of the incompatible systems; receiving by the power supply a wireless universal synchronization signal from a beacon of the first system; determining, by the power supply, a value for a phase offset setting of an internal signal conditioner circuit based on information contained in the wireless universal synchronization signal; generating a phase shifted Alternating Current ("AC") signal by applying a phase offset to an input AC power signal in accordance with the determined value for the phase offset setting; buffering the phase shifted AC signal to generate an output AC power signal; and using a zero crossing of the output AC power signal to synchronize transmit and receive operations of a second system of the incompatible systems with the first system's transmit and receive operations.

In some scenarios, the first system comprises a Business Intelligence Management ("BIM") compatible system and the second system comprises a non-BIM compatible system. Additionally or alternatively, the incompatible systems comprise Acouto-Magnetic ("AM") based Electronic Article Surveillance ("EAS") systems. The AM based EAS systems comprise EAS tag detection systems and/or EAS tag deactivation systems.

In those or other scenarios, the value for a phase offset setting is determined by: generating a digital line reference signal using the information contained in the wireless universal synchronization signal; processing the digital line reference signal by a first Phase Lock Loop ("PLL") to determine a first zero crossing location; processing the input AC power signal by a second PLL to determine a location of a second zero crossing location; and determining a difference between the first and second zero crossing locations.

BRIEF DESCRIPTION OF THE DRAWINGS

The present solution will be described with reference to the following drawing figures, in which like numerals represent like items throughout the figures.

DETAILED DESCRIPTION

Figure 1:
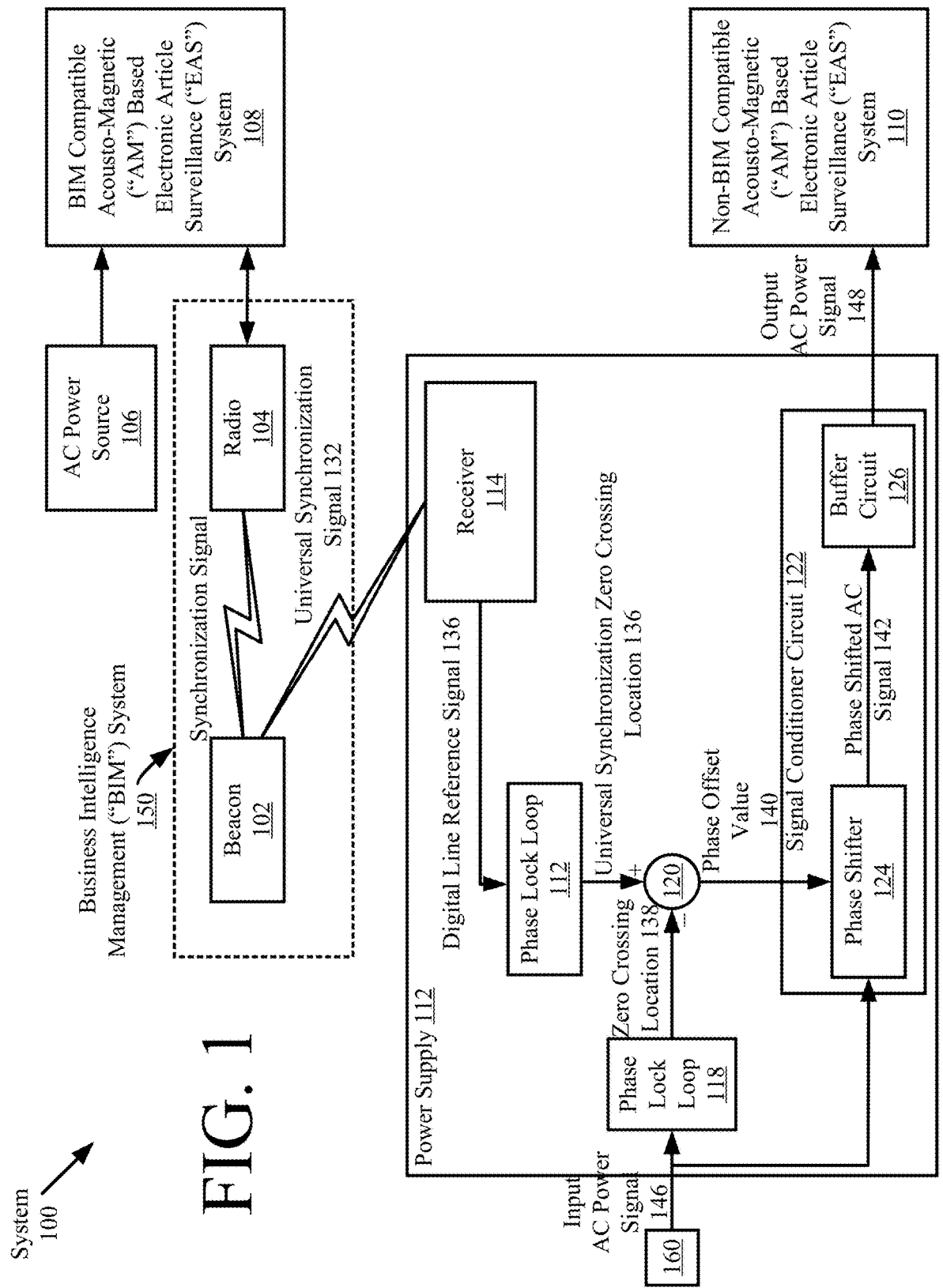
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

One conventional solution synchronizes AM based EAS systems using a beacon. The beacon broadcasts a wireless synchronization signal to end nodes which are connected to AM based EAS devices. The end nodes require direct programming through proprietary software interfaces to allow them to communicate with the beacon.

Currently, there is no method to automatically and continually synchronize other manufacturers' systems. To integrate other manufacturers' devices to the above described conventional solution would require considerable design effort and cooperation between manufacturers of AM based EAS systems. Such cooperation requires unique interfaces. Efforts for each manufacturer would also need to be integrated. This would potentially expose closely held trade knowledge and device data.

The present solution addresses these challenges between manufacturers' AM systems. The present solution allows for adjusting the phase offset (synchronization) reference of an AM based EAS system that uses an AC power line signal as its reference signal, without a need to integrate anything into the product. The benefits are: a universal design reference for all devices; eliminates the need to integrate to each manufacturer's proprietary design saving considerable development costs; removes challenges; provides a permanent synchronization solution that automatically synchronizes non-Business Intelligence Module ("BIM") compatible systems to a BIM system. The present solution uses the wireless synchronization beacon from the BIM system or other beacon to adjust a Phase Lock Loop ("PLL") controlled power supply. The power supply has external controls to configure the power supply to a Personal Area Network ("PAN") identifier ("ID") of the controlling BIM beacon or other beacon. The present solution uses this signal to offset the phase of the AC power output from the power supply. This offset has the effect of delaying (or advancing) the synchronization trigger for the attached non-BIM compatible AM based EAS device, in turn adjusting the offset for transmit and receive cycles, to synchronize them with adjacent synchronization controlled BIM compatible AM systems.

The present solution has multiple operating modes: a controlled mode; a fixed mode; and an autonomous mode. In the control mode, the direct wireless control of a phase offset from a master beacon is allowed by programming of a novel power supply. The novel power supply is designed to support a programmable user interface and/or external manual controls for tooless programming. In the fixed mode, the manual adjustment and setting of the phase offset is allowed through the power supply external manual controls. In the autonomous mode, the power supply is able to find and come under control of its phase offset when a master beacon's signal is detected.

In view of the forgoing, the present solution concerns systems and methods for synchronizing operations of incompatible systems. The methods comprise: programming receiver operations of a power supply so that the power supply is interoperable with a first system of the incompatible systems; receiving by the power supply a wireless universal synchronization signal from a beacon of the first system; determining, by the power supply, a value for a phase offset setting of an internal signal conditioner circuit based on information contained in the wireless universal synchronization signal; generating a phase shifted AC signal by applying a phase offset to an input AC power signal in accordance with the determined value for the phase offset setting; buffering the phase shifted AC signal to generate an output AC power signal; and using a zero crossing of the output AC power signal to synchronize transmit and receive operations of a second system of the incompatible systems with the first system's transmit and receive operations.

In some scenarios, the first system comprises a BIM compatible system and the second system comprises a non-BIM compatible system. Additionally or alternatively, the incompatible systems comprise AM based EAS systems. The AM based EAS systems comprise EAS tag detection systems and/or EAS tag deactivation systems.

In those or other scenarios, the value for a phase offset setting is determined by: generating a digital line reference signal using the information contained in the wireless universal synchronization signal; processing the digital line reference signal by a first PLL to determine a first zero crossing location; processing the input AC power signal by a second PLL to determine a location of a second zero crossing location; and determining a difference between the first and second zero crossing locations.

Illustrative System

Referring now to FIG. 1, there is provided an illustration of a system 100 implementing the present solution. System 100 comprises a Business Intelligence Management ("BIM") system 150 that is generally configured to enhance efficiency of a business (e.g., a retail store) through inventory intelligence. The inventory intelligence is achieved using a beacon 102 and a radio 104 (A) to collect information about EAS tags from a BIM compatible AM based EAS system 108 and (B) to control operations of the BIM compatible AM based EAS system 108 (e.g., transmit and receive timing). Beacons and radios are well known in the art, and therefore will not be described in detail herein. In some scenarios, the beacon 102 comprises a BIM1000 beacon available from Tyco International GmbH of Boca Raton Fla., and the radio is a BIX1000 radio also available from Tyco International GmbH of Boca Raton Fla.

The BIM compatible AM based EAS system 108 includes, but is not limited to, an EAS tag detection system and/or an EAS tag deactivation system (e.g., a tag deactivator unit located at a Point of Sale station). Both of these types of EAS systems are well known in the art, and therefore will not be described herein. Any known or to be known AM based EAS system can be used here provided that it is BIM compatible. The BIM compatible AM based EAS system 108 is supplied power from an AC power source 106. AC power sources are well known in the art, and therefore will not be described herein. Any known or to be known AC power source can be used herein without limitation.

Figure 8:
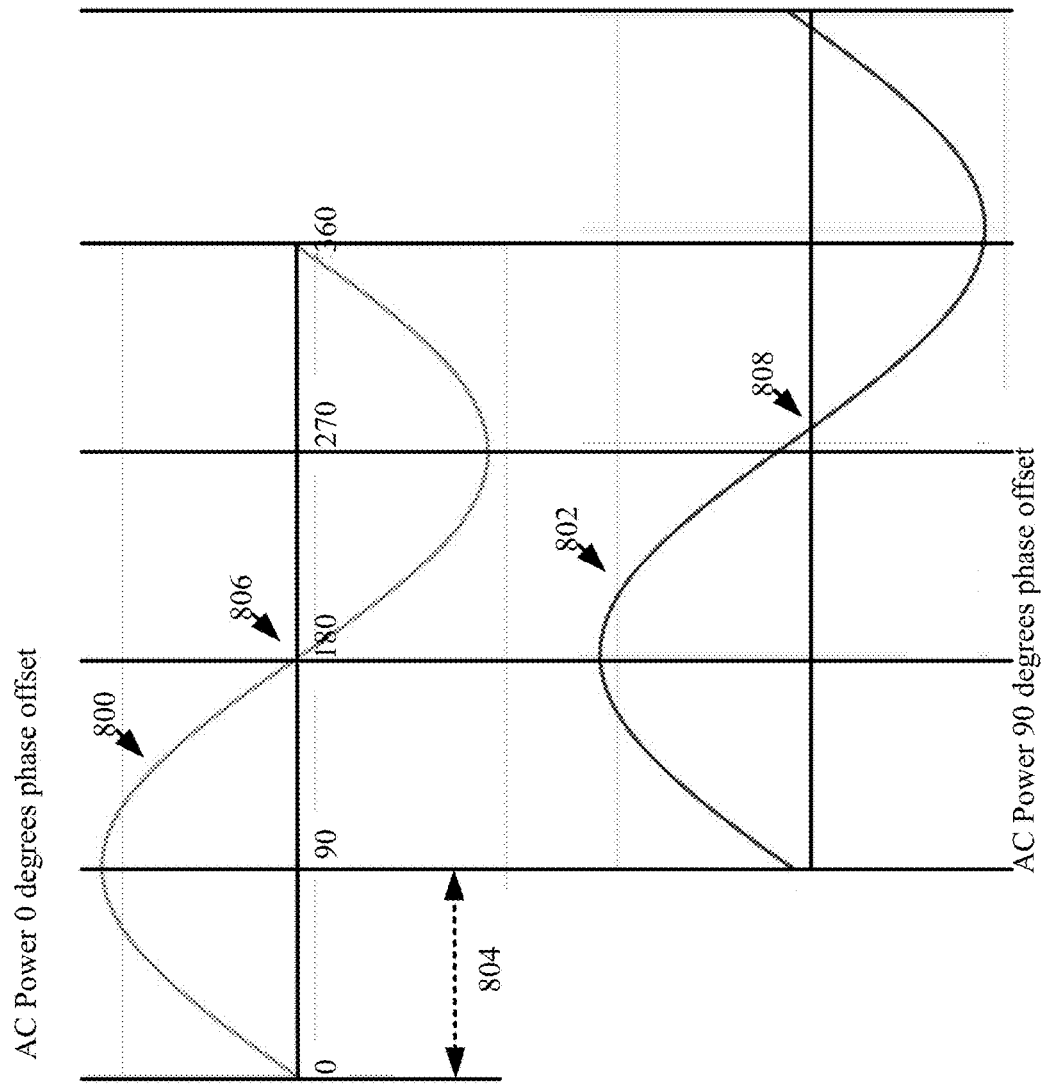
FIG. 8 provides a graph showing illustrative AC power signals.

A graph is provided in FIG. 8 that shows an illustrative input AC power signal 800 provided from the AC power source 106 to the AM based EAS system 108. The transmit and receive cycle timing of the BIM compatible AM based EAS system 108 is controlled by the BIM system 150. For example, the zero crossing 806 of the input AC power signal 800 is used to control the transmit and receive cycle timing.

Figure 9:
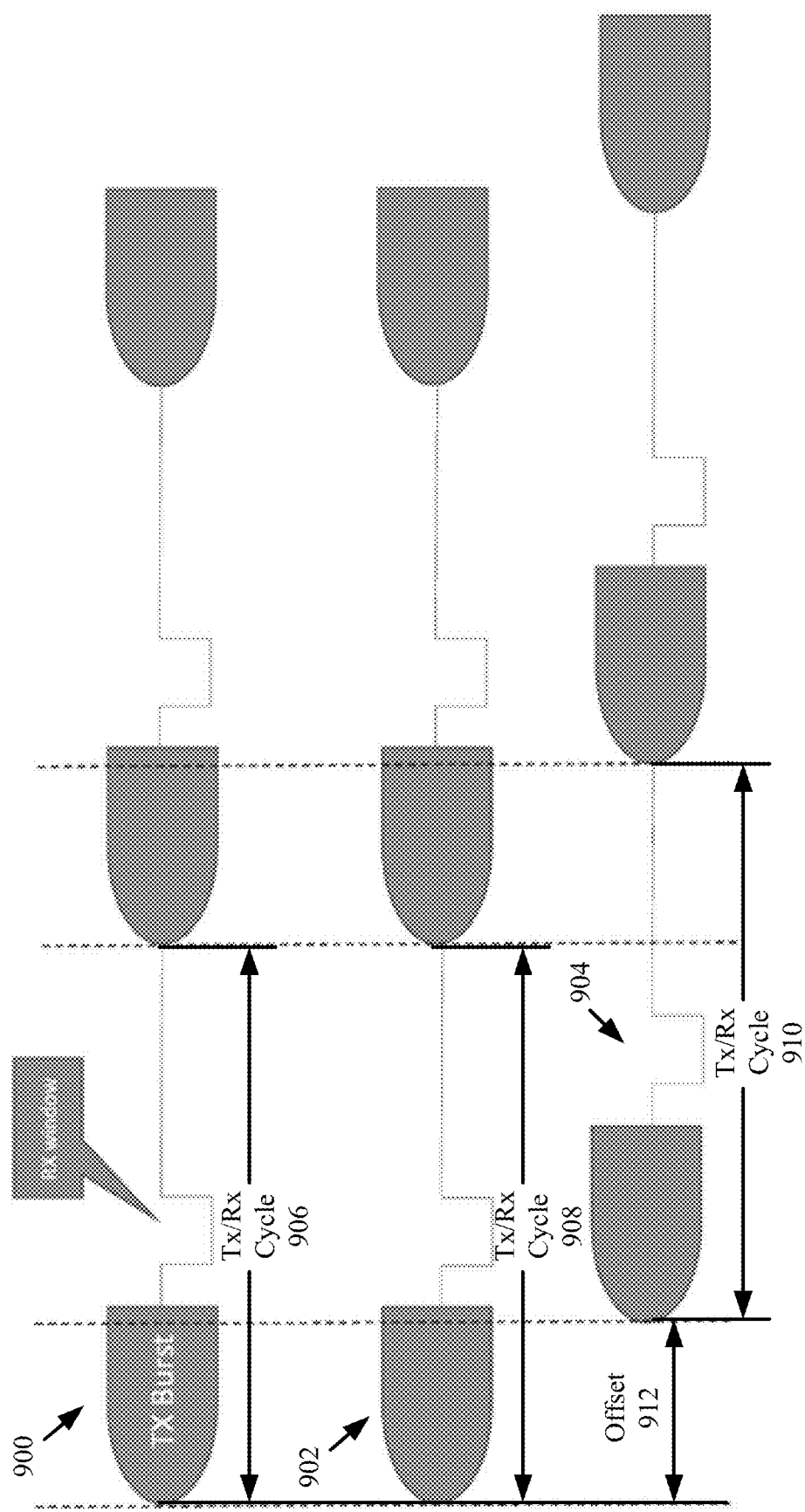
FIG. 9 provides graphs showing transmit and receive cycles of AM based EAS systems.

Another AM based EAS system 110 is located near the AM based EAS system 108. The AM based EAS system 110 also includes, but is not limited to, an EAS tag detection system and/or an EAS tag deactivation system (e.g., a tag deactivator unit located at a Point of Sale station). The AM based EAS system's transmit and receive operations are not typically synchronized with those of the AM based EAS system 108 since the zero crossing of the input AC power signal supplied thereto by another power source 160 is offset from the zero crossing of the AC power signal supplied by the AC power source 106 to the AM based EAS system 108. This is shown in the graphs of FIG. 8-9. In FIG. 8, the AC power signal 800 represents the AC power signal supplied to the AM based EAS system 108 and AC power signal 802 represents the AC power signal supplied to the AM based EAS system 110. There is a ninety degrees phase offset 804 between the two signals 800, 802. In FIG. 9, graph 900 represents the transmit and receive operations of the BIM compatible AM based EAS system 108 and graph 904 represents the transmit and receive operations of the non-BIM compatible AM based EAS system 110 when the present solution is not being employed. There is an offset 912 between the transmit/receive ("Tx/Rx") cycle 906 of the BIM compatible AM based EAS system 108 and the Tx/Rx cycle 910 of the non-BIM compatible AM based EAS system 110.

Since the AM based EAS system 110 is not BIM compatible, its transmit and receive operations are unable to be synchronized with those of the AM based EAS system 108 via the BIM system 150. Accordingly, a novel power supply 112 is provided to facilitate this synchronization. The novel power supply 112 is disposed between the input AC power source 160 and the non-BIM compatible AM based EAS system 110.

The power supply 112 comprises a receiver 114 that is programmed to receive universal synchronization signals 132 from the beacon 102 of the BIM system 150. Receivers are well known in the art, and therefore will not be described herein. Any known or to be known receiver can be used herein without limitation. Upon receipt of a universal synchronization signal 132, the receiver 114 generates a digital line reference signal 136 using information contained in the signal 132. In some scenarios, the universal synchronization signal 132 is packet based, i.e., a packet is periodically transmitted (e.g., every 50-60 Hz). The information included in the packet comprises timing information for transmit and receive operations of a BIM compatible AM based EAS system. The digital line reference signal 136 is provided to a Phase Lock Loop ("PLL") 112. PLLs are well known in the art, and therefore will not be described herein. Any known or to be known PLL can be used herein without limitation.

The PLL 112 processes the digital line reference signal 136 to determine the location of the zero crossing of the AC power signal output from the AC power source 106 (e.g., zero crossing 806 of FIG. 8). The location 136 of this zero crossing is then provided to a subtractor 120. The subtractor 120 determines a difference between the universal synchronization zero crossing location 136 and a zero crossing location 138 of an input AC power signal 146 (e.g., zero crossing 808 of FIG. 8) output from a PLL 118. This difference is then output from the subtractor 120 as a phase offset value 140. Subtractors are well known in the art, and therefore will not be described herein. The phase offset value 140 is used to set a phase offset parameter of a signal conditioner circuit 122.

The signal conditioner circuit 122 comprises a phase shifter 124 and a buffer circuit 126. Phase shifters and buffer circuits are well known in the art, and therefore will not be described in detail herein. Any known or to be known phase shifter and buffer circuit can be used herein without limitation. During operation, the phase shifter 124 receives the input AC power signal 146 from power source 160 and processes the same to shift the phase thereof in accordance with the phase offset value 140. The phase shifter 124 then supplies the phase shifted AC signal 142 to the buffer circuit 126. The buffer circuit 126 buffers the phase shifted AC signal 142 to generate an output AC power signal 148. The output AC power signal 148 is then provided to the non-BIM compatible AM based EAS system 110. The output AC power signal 148 is used to synchronize the transmit and receive cycles of the non-BIM compatible AM based EAS system 110 with those of the BIM compatible AM based EAS system 108. This is shown in FIG. 9. In FIG. 9, graph 900 shows the transmit and receive cycles 906 of the BIM compatible AM based EAS system 108 and graph 902 shows the transmit and receive cycles 908 of the non-BIM compatible AM based EAS system 110 when the present solution is employed. Notably, the Tx/Rx cycles 906, 908 of the two systems 108, 110 are synchronized with each other.

Figure 2:
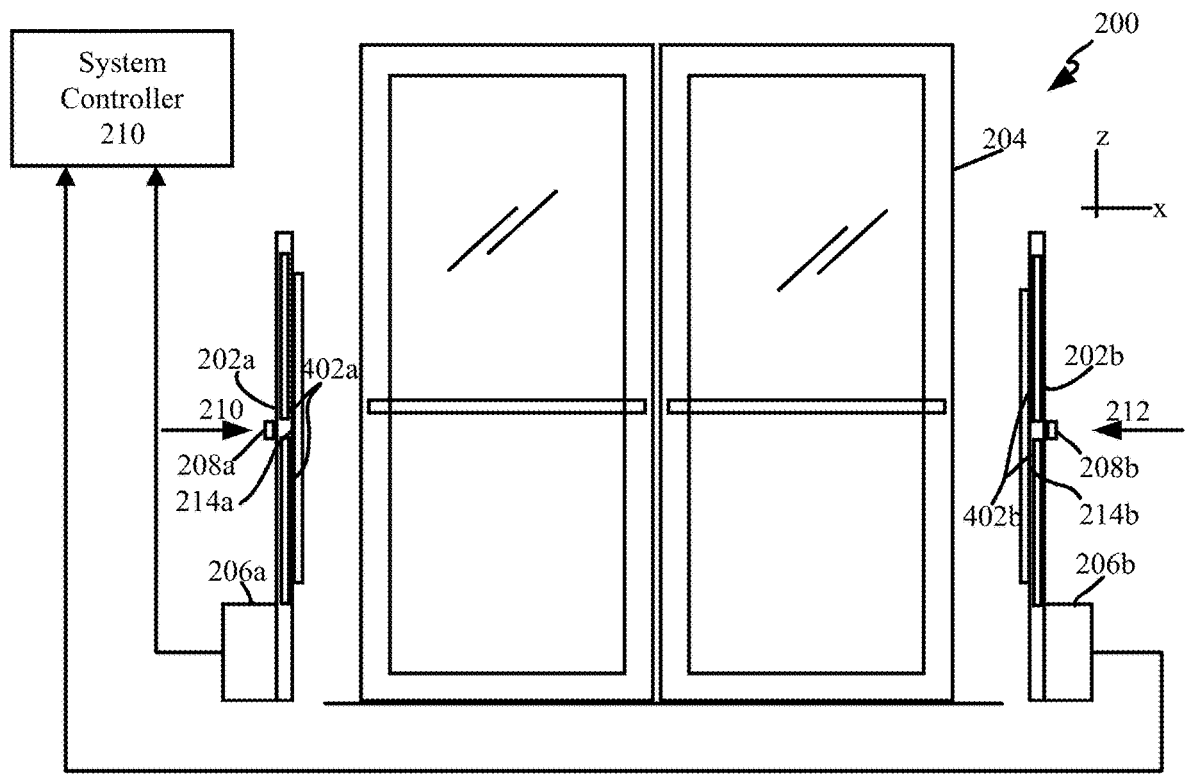
FIG. 2 is a side view of an illustrative EAS tag detection system.
Figure 3:
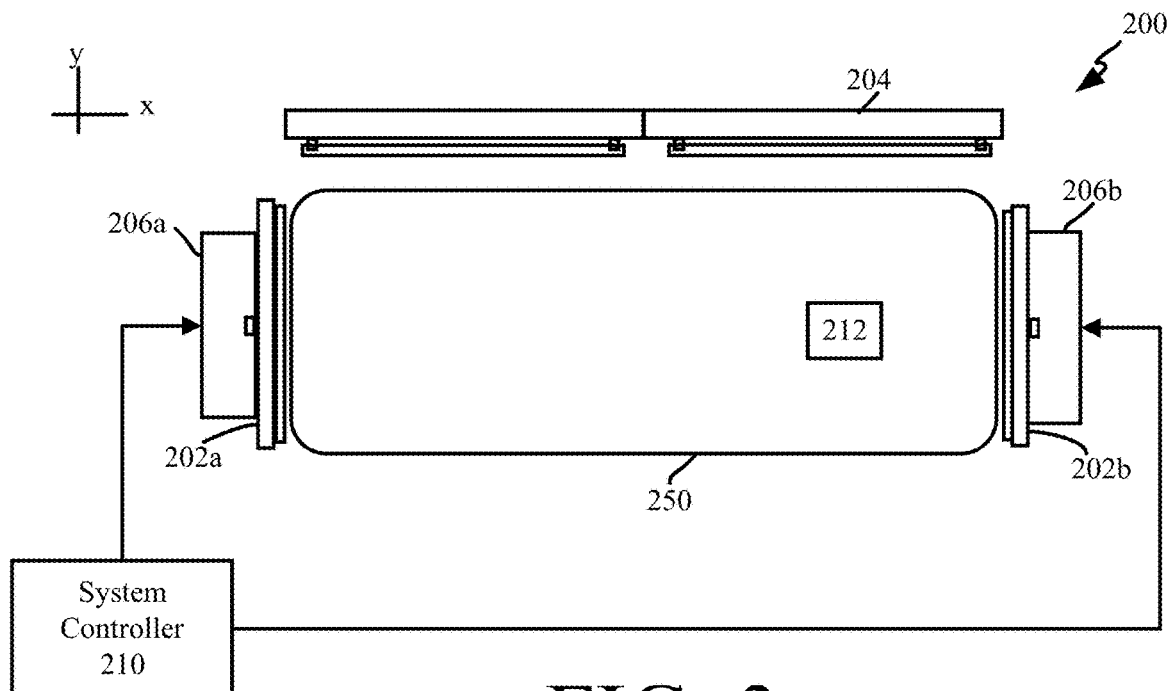
FIG. 3 is a top view of the EAS tag detection system in FIG. 2, which is useful for understanding an EAS detection zone thereof.

Referring now to FIGS. 2 and 3, an illustrative architecture for an EAS tag detection system 200 is provided. The AM based EAS system 108 and/or 110 can be the same as or similar to the EAS tag detection system 200. As such, the discussion of the EAS tag detection system 200 is sufficient for understanding the AM based EAS system 108 and/or 110 of FIG. 1.

The EAS tag detection system 200 is positioned at a location adjacent to an entry/exit 104 of a secured facility (e.g., a retail store). The EAS tag detection system 200 uses specially designed EAS marker tags ("security tags") which are applied to store merchandise or other items which are stored within a secured facility. Security tags are well known in the art, and therefore will not be described herein in detail. Any known or to be known security tag can be used herein without limitation. The security tags can be deactivated or removed by authorized personnel at the secure facility. For example, in a retail environment, the security tags could be removed by store employees.

When an active security tag 212 is detected by the EAS tag detection system 200 in an idealized representation of an EAS detection zone (or interrogation zone) 250 near the entry/exit, the EAS tag detection system will detect the presence of such security tag and will sound an alarm or generate some other suitable EAS response. Accordingly, the EAS tag detection system 200 is arranged for detecting and preventing the unauthorized removal of articles or products from controlled areas.

The EAS tag detection system 200 includes a pair of pedestals 202a, 202b, which are located a known distance apart (e.g., at opposing sides of an entry/exit 204). The pedestals 202a, 202b are typically stabilized and supported by a base 206a, 206b. The pedestals 202a, 202b will each generally include one or more antennas that are suitable for aiding in the detection of the special EAS security tags, as described herein. For example, pedestal 202a can include at least one antenna 402 suitable for transmitting or producing an electromagnetic exciter signal field (or interrogation signal) and receiving response signals generated by active security tags in the EAS detection zone 250. In some scenarios, the same antenna can be used for both receive and transmit functions. Similarly, pedestal 202b can include at least one antenna 402 suitable for transmitting or producing an electromagnetic exciter signal field (or interrogation signal) and receiving response signals generated by security tags in the EAS detection zone 250. The antennas provided in pedestals 202a, 202b can be conventional conductive wire coil or loop designs as are commonly used in AM type EAS pedestals. These antennas will sometimes be referred to herein as exciter coils. In some scenarios, a single antenna can be used in each pedestal. The single antenna is selectively coupled to the EAS receiver. The EAS transmitter is operated in a time multiplexed manner. However, it can be advantageous to include two antennas (or exciter coils) in each pedestal as shown in FIG. 2, with an upper antenna positioned above a lower antenna.

The antennas located in the pedestals 202a, 202b are electrically coupled to a system controller 210. The system controller 210 controls the operation of the EAS tag detection system 200 to perform EAS functions as described herein. The system controller 210 can be located within a base 206a, 206b of one of the pedestals 202a, 202b or can be located within a separate chassis at a location nearby to the pedestals. For example, the system controller 210 can be located in a ceiling just above or adjacent to the pedestals 202a, 202b.

As noted above, the EAS detection system comprises an AM type EAS detection system. As such, each antenna is used to generate an Electro-Magnetic ("EM") field which serves as a security tag exciter signal. The security tag exciter signal (or interrogation signal) causes a mechanical oscillation of a strip (e.g., a strip formed of a magnetostrictive or ferromagnetic amorphous metal) contained in a security tag within an EAS detection zone 250. As a result of the stimulus signal, the security tag will resonate and mechanically vibrate due to the effects of magnetostriction. This vibration will continue for a brief time after the stimulus signal (or interrogation signal) is terminated. The vibration of the strip causes variations in its magnetic field, which can induce an AC signal in the receiver antenna. This induced signal is used to indicate a presence of the strip within the EAS detection zone (or interrogation zone) 250.

As noted above, the same antenna contained in a pedestal 202a, 202b can serve as both the transmit antenna and the receive antenna. Accordingly, the antennas in each of the pedestals 202a, 202b can be used in several different modes to detect a security tag exciter signal. These modes will be described below in further detail.

Figure 4:
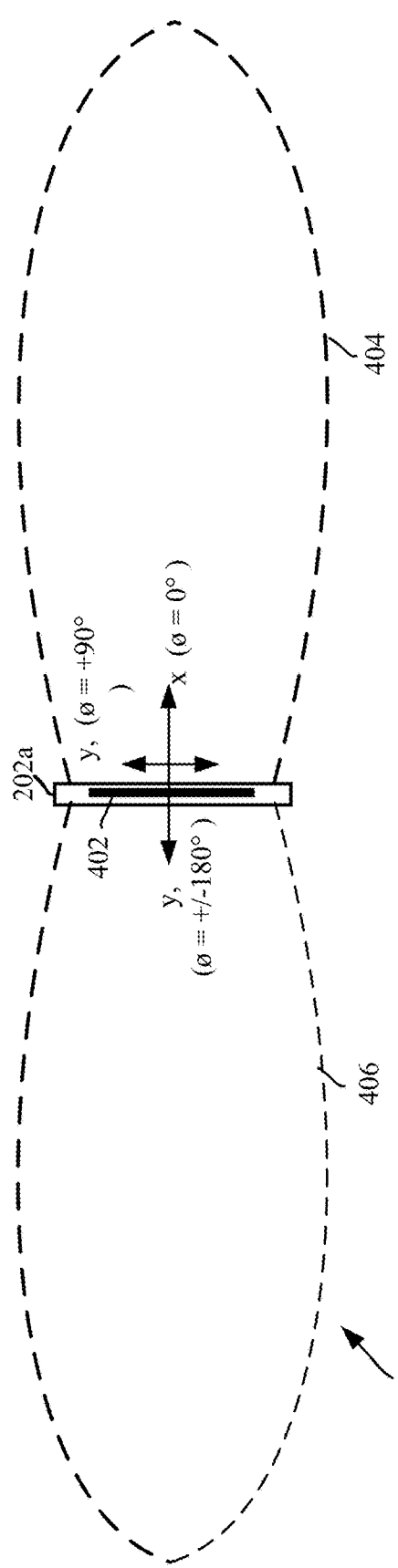
FIGS. 4 and 5 are drawings which are useful for understanding a main field and a back-field of antennas which are used in the EAS tag detection system of FIG. 2.
Figure 5:
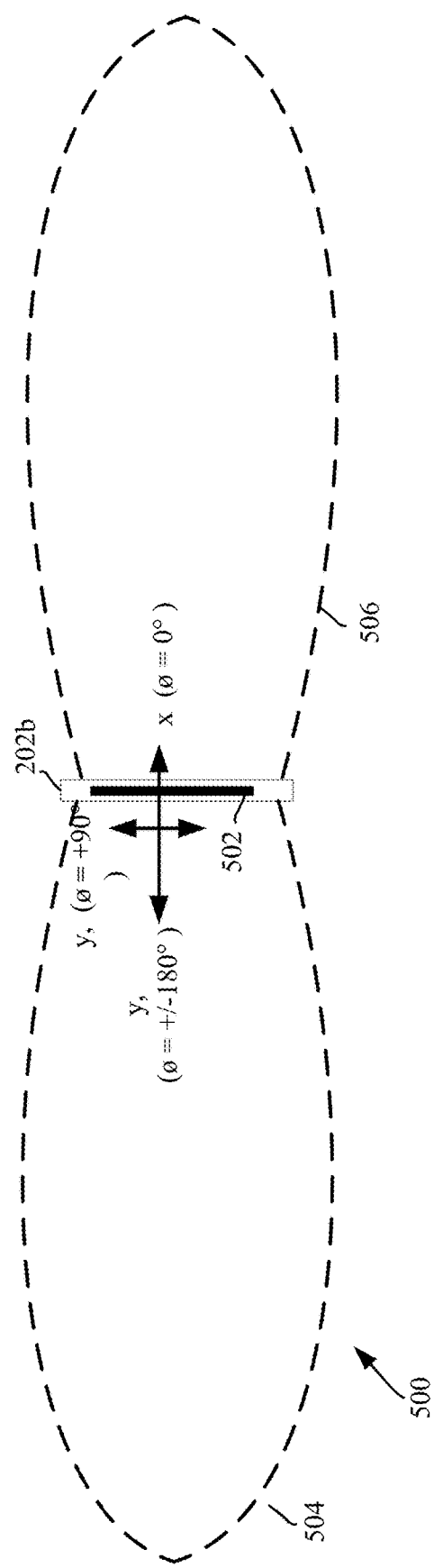

Referring now to FIGS. 4 and 5, there are shown exemplary antenna field patterns 400, 500 for antennas 402, 502 contained in pedestals 202a, 202b. As is known in the art, an antenna radiation pattern is a graphical representation of the radiating (or receiving) properties for a given antenna as a function of space. The properties of an antenna are the same in a transmit mode and a receive mode of operation. As such, the antenna radiation pattern shown is applicable for both transmit and receive operations as described herein. The exemplary antenna field patterns 400, 500 shown in FIGS. 4-5 are azimuth plane patterns representing the antenna pattern in the x, y coordinate plane. The azimuth pattern is represented in polar coordinate form and is sufficient for understanding the inventive arrangements. The azimuth antenna field patterns shown in FIGS. 4-5 are a useful way of visualizing the direction in which the antennas 402, 502 will transmit and receive signals at a particular transmitter power level.

Figure 6:
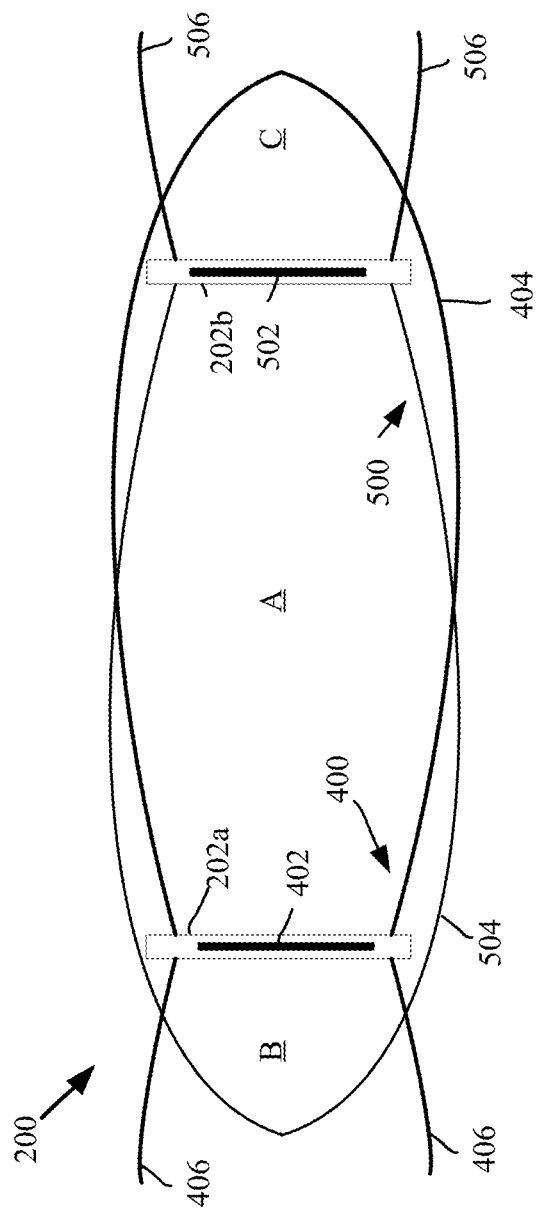
FIG. 6 is a drawing which is useful for understanding a detection zone in the EAS tag detection system of FIG. 2.

The antenna field pattern 400 shown in FIG. 4 includes a main lobe 404 with a peak at $\phi=0°$ and a back-field lobe 406 with a peak at angle $\phi=180°$. Conversely, the antenna field pattern 500 shown in FIG. 5 includes a main lobe 504 with its peak at $\phi=180°$ and a back-field lobe 506 with a peak at angle $\phi=0°$. In the EAS tag detection system 200, each pedestal 202a, 202b is positioned so that the main lobe of an antenna contained therein is directed into the EAS detection zone (or interrogation zone) 250. Accordingly, a pair of pedestals 202a, 202b in the EAS tag detection system 200 will produce overlap in the antenna field patterns 400, 500, as shown in FIG. 6. Notably, the antenna field patterns 400, 500 shown in FIG. 6 are scaled for purposes of understanding the present solution. In particular, the patterns show the outer boundary or limits of an area in which an exciter signal of particular amplitude applied to antennas 402, 502 will produce a detectable response in an EAS security tag. However, it should be understood that a security tag within the bounds of at least one antenna field pattern 400, 500 will generate a detectable response when stimulated by an exciter signal.

The overlapping antenna field patterns 400, 500 in FIG. 6 will include an area A where there is overlap of main lobes 404, 504. However, it can be observed in FIG. 6 that there can also be some overlap of a main lobe of each pedestal with a back-field lobe associated with the other pedestal. For example, it can be observed that the main lobe 504 overlaps with the back-field lobe 406 within an area B. Similarly, the main lobe 404 overlaps with the back-field lobe 406 in an area C. Area A between pedestals 202a, 202b defines the EAS detection zone 250 in which active security tags should cause the EAS tag detection system 200 to generate an alarm response. Security tags in area A are stimulated by energy associated with an exciter signal within the main lobes 404, 504 and will produce a response which can be detected at each antenna. The response produced by a security tag in area A is detected within the main lobes of each antenna and processed in the system controller 210. Notably, a security tag in areas B or C will also be excited by the antennas 402, 502. The response signal produced by a security tag in these areas B and C will also be received at one or both antennas. This response signal is referred to herein as a "security tag signal".

Illustrative Method for Synchronizing Incompatible Systems

Figure 7:
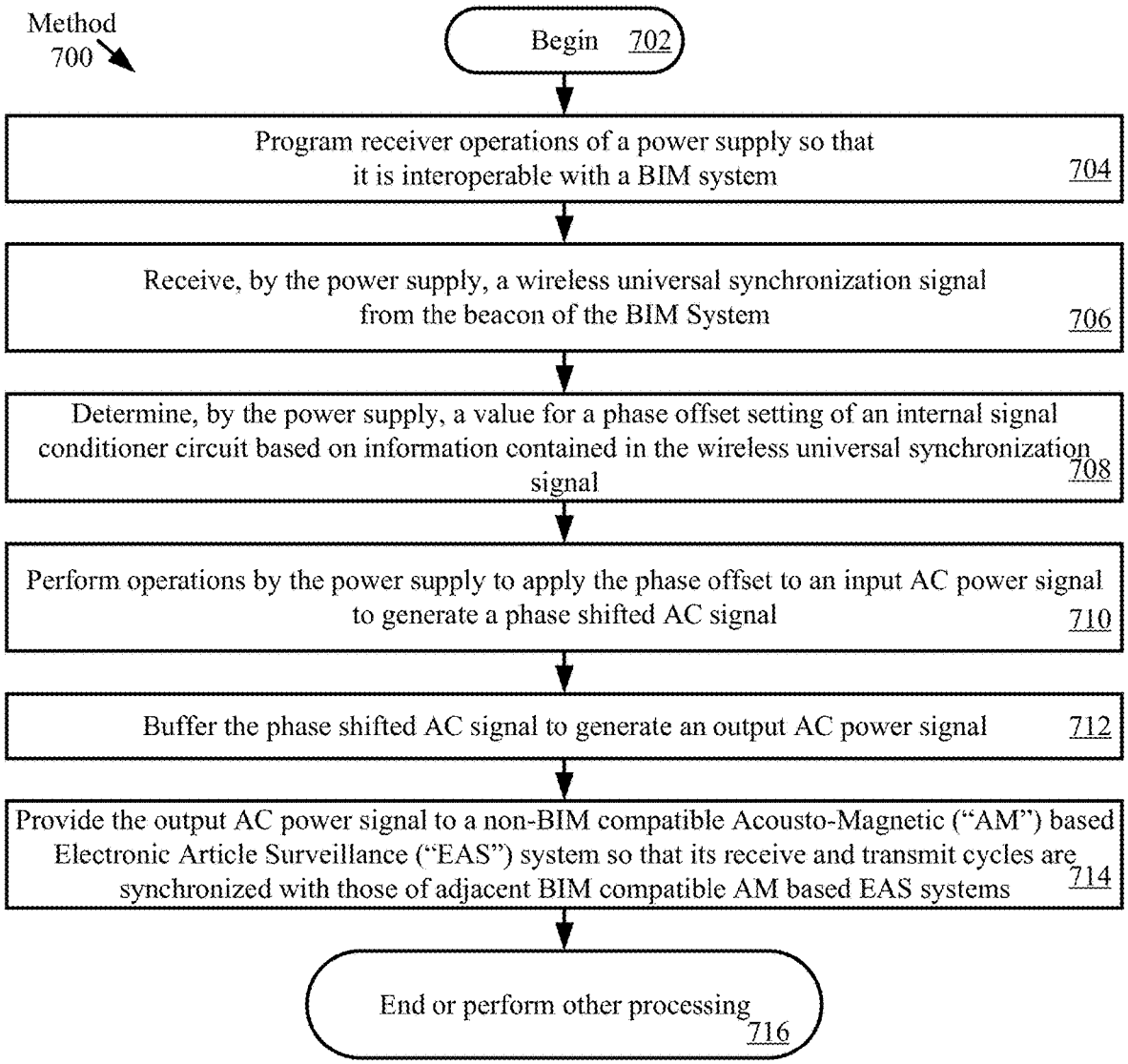
FIG. 7 is a flow diagram of an illustrative method for synchronizing operations of incompatible systems.

Referring now to FIG. 7, there is provided a flow diagram of an illustrative method 700 for synchronizing operations of incompatible systems (e.g., AM based EAS systems 108, 110 of FIG. 1). Method 700 begins with 702 and continues with 704 where receiver operations of a power supply (e.g., power supply 112 of FIG. 1) are programmed so that the power supply is interoperable with a BIM system (e.g., BIM system 150 of FIG. 1). Next in 706, the power supply receives a wireless universal synchronization signal (e.g., signal 132 of FIG. 1) from the beacon (e.g., beacon 102 of FIG. 1) of the BIM system. The power supply determines a value for a phase offset setting of an internal signal conditioner circuit (e.g., signal conditioner circuit 122 of FIG. 1) based on information contained in the wireless universal synchronization signal, as shown by 708. In 710, the power supply performs operations to apply the phase offset to an input AC power signal (e.g., input AC power signal 146 of FIG. 1) whereby a phase shifted AC signal (e.g., phase shifted AC signal 142 of FIG. 1) is generated. The phase shifted AC signal is buffered in 712 to generate an output AC power signal (e.g., output AC power signal 148 of FIG. 1). The output AC power signal is provided to a non-BIM compatible AM based EAS system (e.g., system 110 of FIG. 1) in 714. The zero crossing of the output AC power signal is used to synchronize the non-BIM compatible AM based EAS system's transmit and receive operations with those of an adjacent BIM compatible AM based EAS system (e.g., system 108 of FIG. 1). Subsequently, 716 is performed where method 700 ends or other processing is performed (e.g., return to 706).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for synchronizing operations of a plurality of incompatible systems, comprising:
   programming receiver operations of a power supply so that the power supply is interoperable with a first system of the plurality of incompatible systems;
   receiving by the power supply a wireless universal synchronization signal from a beacon of the first system, the wireless universal synchronization signal not being received by a second system of the plurality of incompatible systems, the second system not being interoperable with the first system;
   determining, by the power supply, a value for a phase offset setting of an internal signal conditioner circuit based on information contained in the wireless universal synchronization signal;
   generating a phase shifted Alternating Current ("AC") signal by applying a phase offset to an input AC power signal in accordance with the determined value for the phase offset setting;
   buffering the phase shifted AC signal to generate an output AC power signal; and
   using a zero crossing of the output AC power signal to synchronize second transmit and receive operations of the second system with first transmit and receive operations of the first system.

2. The method according to claim 1, wherein the first system comprises a Business Intelligence Management ("BIM") compatible system and the second system comprises a non-BIM compatible system.

3. The method according to claim 1, wherein the incompatible systems comprise Acouto-Magnetic ("AM") based Electronic Article Surveillance ("EAS") systems.

4. The method according to claim 3, wherein the AM based EAS systems comprise EAS tag detection systems.

5. The method according to claim 3, wherein the AM based EAS systems comprise EAS tag deactivation systems.

6. The method according to claim 1, wherein the value for the phase offset setting is determined by:
   generating a digital line reference signal using the information contained in the wireless universal synchronization signal;
   processing the digital line reference signal by a first Phase Lock Loop ("PLL") to determine a first zero crossing location;
   processing the input AC power signal by a second PLL to determine a location of a second zero crossing location; and
   determining a difference between the first zero crossing location and the second zero crossing location.

7. A power supply, comprising:
   a receiver configured to receive a wireless universal synchronization signal from a beacon of a first system of a plurality of incompatible systems, the wireless universal synchronization signal not being received by a second system of the plurality of incompatible systems, the second system not being interoperable with the first system; and
   a circuit configured to:
      determine a value for a phase offset setting of an internal signal conditioner circuit based on information contained in the wireless universal synchronization signal;
      generate a phase shifted Alternating Current ("AC") signal by applying a phase offset to an input AC power signal in accordance with the determined value for the phase offset setting;
      buffer the phase shifted AC signal to generate an output AC power signal; and
      use a zero crossing of the output AC power signal to synchronize second transmit and receive operations of the second system with first transmit and receive operations of the first system.

8. The power supply according to claim 7, wherein the first system comprises a Business Intelligence Management ("BIM") compatible system and the second system comprises a non-BIM compatible system.

9. The power supply according to claim 7, wherein the incompatible systems comprise Acousto-Magnetic ("AM") based Electronic Article Surveillance ("EAS") systems.

10. The power supply according to claim 9, wherein the AM based EAS systems comprise EAS tag detection systems.

11. The power supply according to claim 9, wherein the AM based EAS systems comprise EAS tag deactivation systems.

12. The power supply according to claim 7, wherein the value for the phase offset setting is determined by:
generating a digital line reference signal using the information contained in the wireless universal synchronization signal;
processing the digital line reference signal by a first Phase Lock Loop ("PLL") to determine a first zero crossing location;
processing the input AC power signal by a second PLL to determine a location of a second zero crossing location; and
determining a difference between the first zero crossing location and the second zero crossing location.

\* \* \* \* \*